United States Patent Office 3,204,287
Patented Sept. 7, 1965

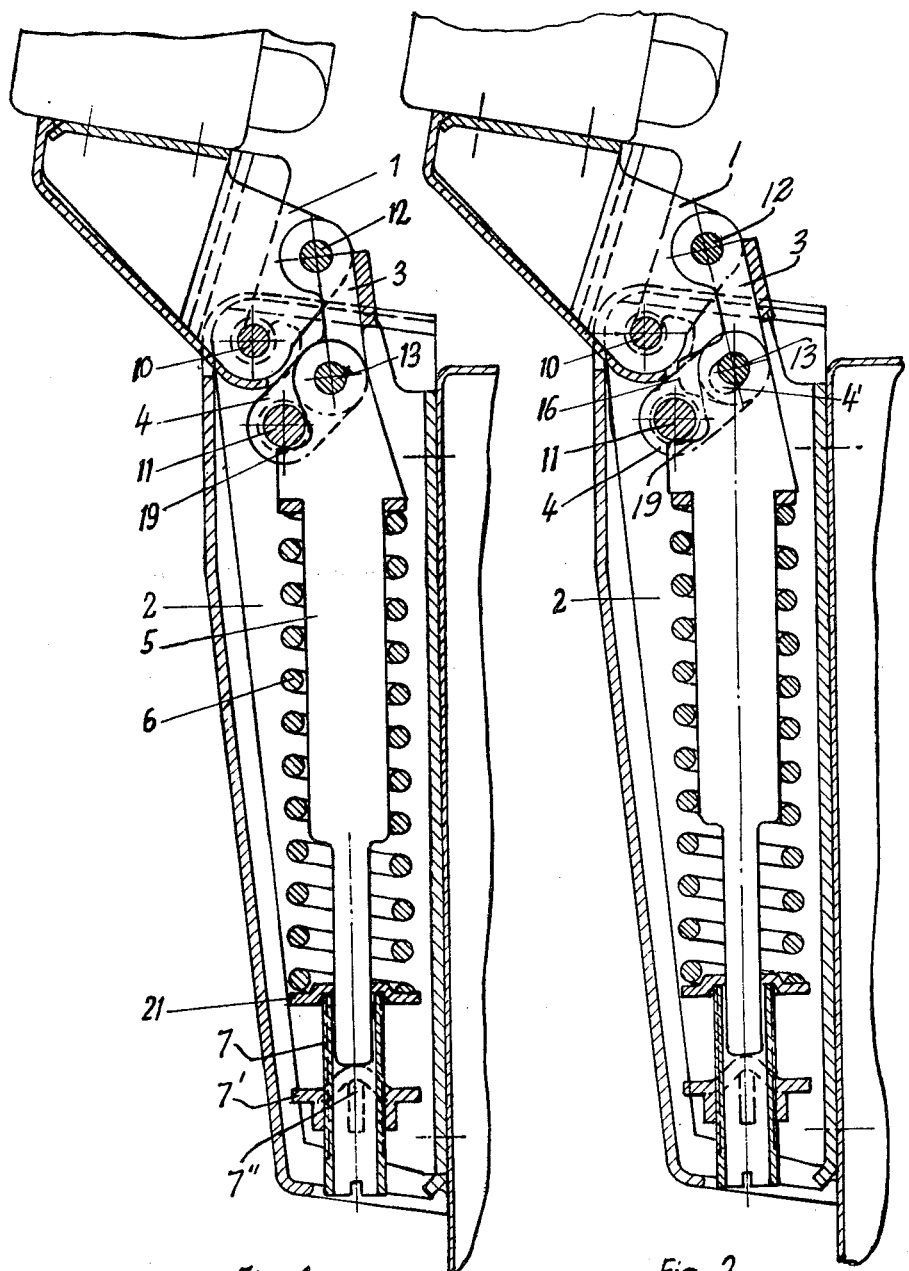

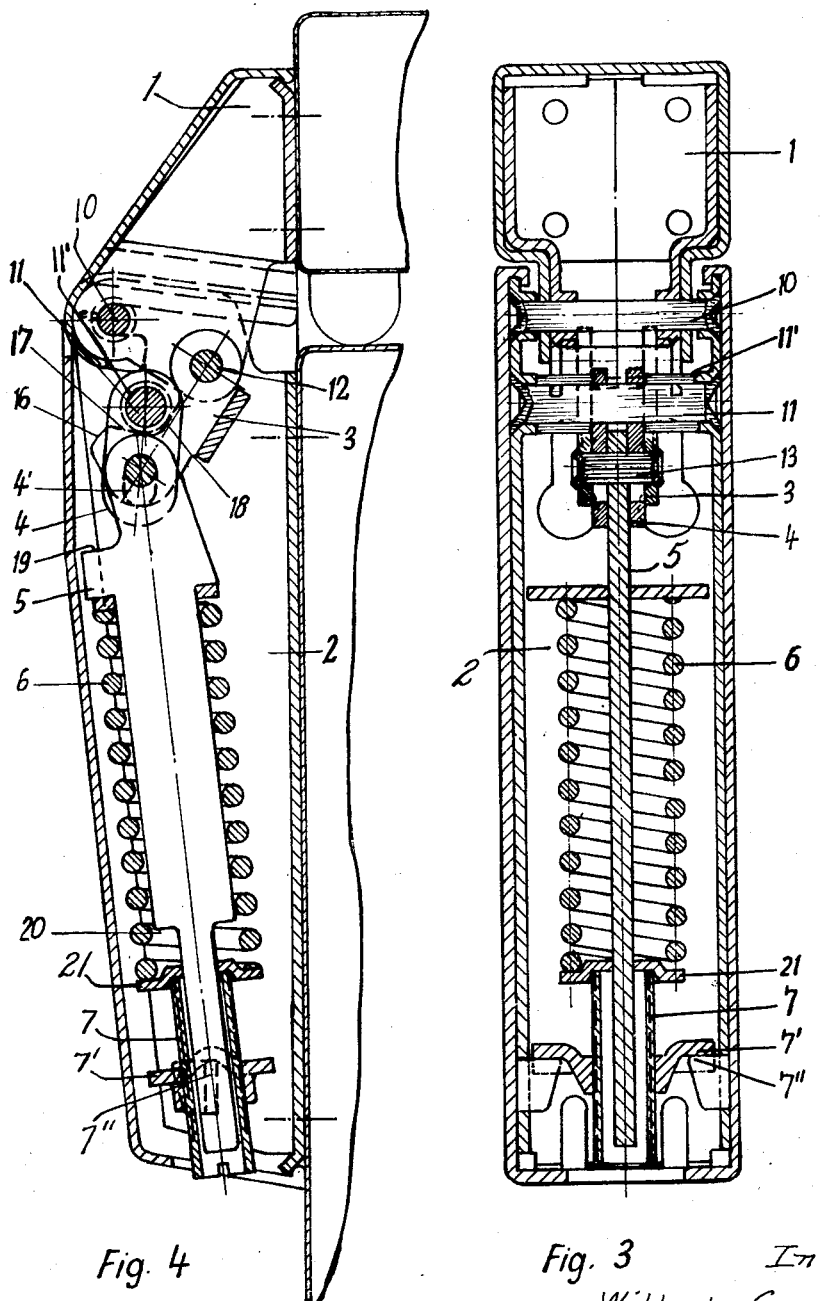

3,204,287
SPRING-LOADED HINGE FOR BALANCING THE
WEIGHT OF A WING, LID OR THE LIKE
Wilhelm Gronbach, 9 Alpenstrasse, Ebersberg, near
Munich, Germany
Filed Mar. 28, 1963, Ser. No. 268,627
Claims priority, application Germany, Mar. 31, 1962,
G 34,618; Oct. 19, 1962, G 26,763
16 Claims. (Cl. 16—163)

This invention relates to a pivotal hinge or joint incorporating a spring adapted to balance the weight of, and to close a horizontally supported wing, cover, flap, hood or the like, for example of a deep-freezing chest. This hinge is intended to maintain a wing or the like in any desired position between its closed position and a position in which it has been swung open through an angle of approximately 90°, it being understood that the torque applied by the spring and transmitted to a lever system must always equal the torque or moment produced by the weight of the wing in order to cause the wing to appear weightless during operation and in any position thereof, and in order to prevent the wing from falling into its closed position and from being projected in an upward direction.

In addition it is desirable for the wing to be urged into its closed position either due to its own weight or due to its own weight plus an additional force for the purpose of sealing the closure, this action taking place as shortly as possible before the moment in which the wing reaches its horizontal position in which it is then supported. In the case of extremely heavy lids it is desired to cause only part of the weight of the lid to move the lid into its closed position, as otherwise the operator would have to apply an excessively large force to open the cover. The frictional force with which the hinge opposes its displacement should not be too large, as otherwise the advantage afforded by the perfect balance of the weight of the cover would be lost to a large extent.

There have already been proposed hinge structures performing the aforementioned functions, but these known structures are either complicated, thus being expensive, or their performance is not satisfactory in every respect. A particularly difficult problem arises from the necessity of reversing the turning moments at the time the cover is moved into its closed position. It will be understood that, with the wing in an open or half-open position, it is necesary to apply a moment acting in opposition to the weight of the wing, whereas, with the wing supported in its closed position, the moment should act in an opposite direction in order to urge the wing against the sealing means; in any event, the entire weight of the wing should be available in this position of the wing. It has been found in practice that it is convenient to start the reversal of the moment as soon as the wing comes within about 10° of its closed position, the arrangement being such that in the 10° position the moment fully acts in one direction and that in the 0° position the full moment acts in the opposite direction. During the opening motion of the wing, the moment serving to balance the weight of the wing is then reduced accordingly.

Thus there arises the problem of devising a mechanism which, while not using an excessively high spring pressure in its horizontal or its 10° position, will produce an extreme change in spring pressure, i.e. a complete reversal thereof. This effect is preferably obtained by displacing a lever arm upon the point of reversal being reached. Besides that, the mechanism should be of such a nature that no risk of jamming exists in any position thereof. This is of particular importance in view of the fact that in almost all cases the wing is provided with two hinges. Thus, in the event one of the two hinges, due to minor manufacturing tolerances, should reverse its moment at an earlier time than the other hinge, this must under no circumstances result in jamming.

The pattern of the moment produced by a horizontally disposed wing having a uniform weight per unit area upon being swung upwardly through 90° follows a cosine function. A helical spring, however, will produce a linearly varying increasing or decreasing force. Therefore, it will be necessary to arrange a helical spring in such a manner as to obtain a balancing moment following a cosine function.

The solution to the afore-indicated problem of devising a hinge including a spring serving to balance the weight of a wing or a cover or a flap or the like constituting, for example a component part of a deep freezing chest, in which the spring is supported under preload in the stationary hinge member on the one hand and, through the medium of intermediate levers in the hinge member connected to the wing, according to the invention resides in the fact that the intermediate lever arrangement forms a system comprising four joints and adapted to produce a moment following a cosine function, the said system being constituted by a hinge joint, a second joint connected to the stationary hinge member, and third and fourth joints interconnected by a link, the distance between the said hinge joint and the movable joint associated therewith being larger than the distance between the two other joints. According to a further feature of the invention, one of the two movable joints is connected to the hinge member which is secured to the wing, whereas the other one of the two movable joints is connected to the stationary joint associated therewith by a pivotable link provided, at one end thereof, with a bearing in the form of an elongated hole, the arrangement being such that the effective length of the pivotable link can be adjusted, for example, at a ratio of 4:3.

Moreover, the invention takes into consideration those exceptional cases in which it is impossible, due to the large dimensions and the resulting heavy weight of the cover, to produce a sufficient effect by means of a spring of a given diameter and a given length, and which, due to local conditions, it is impossible simply to increase the number of hinges used. For such cases the invention contemplates an embodiment in which a second or additional spring is concentrically disposed within a first spring. Thus, the outside diameter and the length of the helical spring arrangement remain unchanged, there being no necessity of modifying the hinge housing. Nevertheless this arrangement affords a greater spring force equaling the sum of the forces exerted by the two springs. It will be understood that for economic reasons it is of great importance to be able to use only a single size of hinge in the two aforementioned cases, as this will permit reduction of the cost of manufacturing the hinges. It will also be understood that an additional spring will have to be provided in such cases only in which it is no longer possible to produce the required spring force by selecting a suitable spring wire diameter while retaining the diameter and the length of the helical spring. Preferably one of the two springs is left-handed, while the other is right-handed.

Other objects and features of the invention will become apparent as the description proceeds, especially when taken in conjunction with the accompanying drawing, illustrating preferred embodiments of the invention, wherein:

FIG. 1 is a vertical cross-sectional view of one embodiment of a hinge according to the invention in its open position;

FIG. 2 is a vertical cross-sectional view of another embodiment in its open position, in which the wing, in its closed position, is urged against the sealing means by an additional force;

FIG. 3 is a vertical cross-sectional view of the hinge of FIG. 2, the sectioning plane of FIG. 3 extending at right angles to that of FIG. 2;

FIG. 4 is a vertical cross-sectional view of the hinge showing the wing in its closed position.

Figure 5:
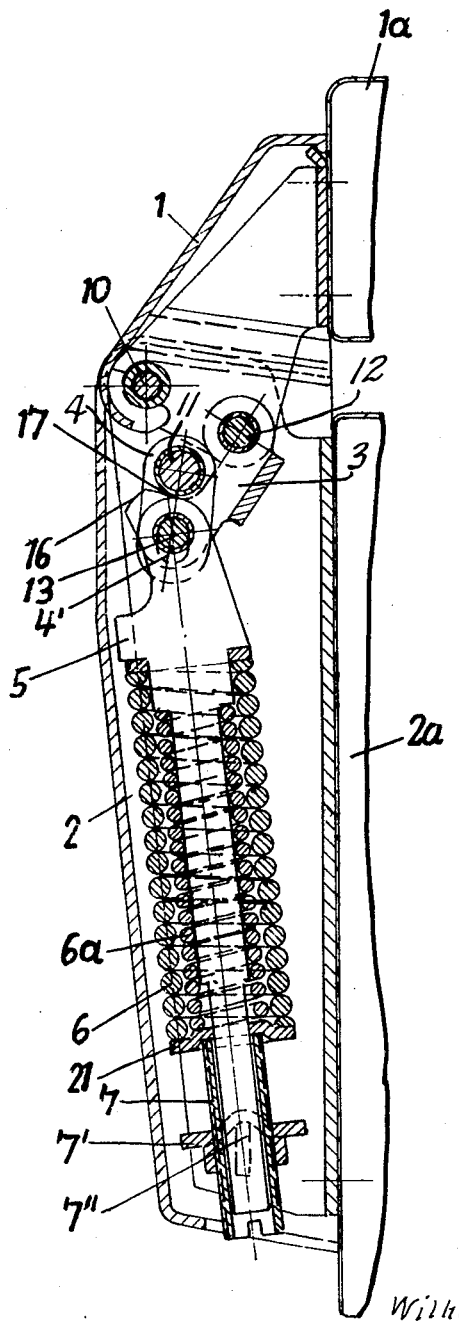
FIG. 5 is a vertical cross-sectional view of a hinge according to the invention comprising two concentrically disposed helical springs.

Referring now more in particular to the drawings, there will be seen in FIGS. 1 and 2 two embodiments including a hinge member 1 connected to the wing, and a hinge member 2 connected to a container. The two hinge members are pivotally connected by a joint 10. Also connected to hinge member 1 is a joint 12 co-operating with a link 3. Secured to hinge member 2 is the pivot pin of joint 11 which is connected to joint 13 by a rotary arm 4. The two joints 12 and 13 are interconnected by link 3.

The link 3 and a spring guide rod 5, which parts are guided by the rotary arm 4, transmit the force of the helical spring 6 to the hinge member 1 associated with the movable wing. The upper end of helical spring 6 bears on a shoulder provided on spring guide rod 5, the lower end of spring 6 being supported, through the medium of a retainer 21, by a spring guide tube 7 provided with external threads and threadedly engaged in an internally threaded cradle member 7', this cradle member resting on a bearing edge 7" provided in the hinge member 2 associated with the container. The tension of helical spring 6 can be adjusted by rotating the spring guide tube relative to the cradle member.

The lower end of link 3 is formed with a control cam 16 and a tensioning cam 17. In the embodiment of FIG. 2, the rotary arm 4 is further provided at one end thereof with an elongated hole 4' serving as a bearing for the pivot pin 13, the said elongated hole permitting the effective lever arm to be displaced, for example from a 16-mm. (⅝ in.) position to a 12-mm (15/32 in.) position, this affording a ratio of 4 to 3.

For the purpose of describing the function of the hinge, attention is now directed to FIGS. 1 and 2 showing the wing in its open position. Spring 6 exerts a force on the pin 12 of the hinge member 1 associated with the wing through spring guide rod 5, pin 13 and link 3. Pivot pin 13 connects spring guide rod 5 to link 3 and is guided in the elongated hole 4' by the rotary arm. When the wing performs its closing motion, the control cam 16 of link 3 will slide on a roller 11' protecting the pin 11 until the position shown in FIG. 4 is reached. The shape of the control cam is such as to ensure that, during the closing motion, the pin of the joint will retain its position in the elongated hole of rotary arm 4 as shown in FIG. 2. Only after the wing has reached its closed position will the spring 6 urge the pin 13 into a position at the opposite end of the elongated hole as shown in FIG. 4.

Thus, while the wing is being swung round, the pivot pin 13 will retain its largest possible distance from roller 11' and pivot pin 11. It will be understood that the distance between pivot pins 11 and 13 is smaller than the distance between hinge pin 10 and pivot pin 12. Thus, upon the wing being swung through a given angle, the rotary arm 4 will be pivoted through a larger angle. This will produce a change in the turning moment in such a manner that the moment follows a cosine function.

The control cam 16 of link 3 merges into the tensioning cam 17. As will be seen in FIG. 4 showing the wing in its closed position, the spring 6 exerts a force on the spring guide rod 5 and, through pivot pin 13, forces the tensioning cam 17 of link 3 against roller 11', thus tending to move link 3 to the left. This causes a torque to be applied to the wing, which torque serves to press the wing against its sealing means. With the tensioning cam being of suitable shape, the pivot pin 13 will be simultaneously urged into its extreme inner position. Depending on the shape of the tensioning cam, this extreme position will be reached to a greater or less extent. This, however, determines the position of the link and hence the pressure with which the wing is urged against the sealing means. Thus, depending on the shape of the tensioning cam, a higher or lower pressure will urge the wing against the seal of the container. It is also possible to relieve the wing of part of its deadweight.

Opening the wing through an angle of 10° will cause the link 3 together with the tensioning cam 17 and the control cam 16 to be swung about roller 11' and pivot pin 11 in such a manner as to cause the distance between pin 13 and roller 11' to become a maximum, the pin 11 thus being subject to a maximum of leverage for the purpose of completely balancing the weight of the wing in any position thereof. The provision of the control cam ensures that the effective length of rotary arm 4 always is a maximum, as the pin 13 is in its outer position.

As shown in FIG. 4, the link 3, during closure of the wing, is moved to such an extent that roller 11' rests against the inner side of the link at 18. By suitably shaping the link as regards the position of point 18 it is possible to limit the final position of the wing in any desired manner while the wing is being urged against the sealing means. If desired, the location of point 18 may be selected in such a manner as to render it impossible to close the wing completely. In this case, the wing will always be left slightly ajar.

The same effect may also be obtained with the aid of a specially formed spring guide rod 5, i.e. by means of the shoulder 20. When the spring guide tube 7 is advanced far enough into the threaded hole to cause the shoulder 20 to abut the spring retainer 21 before the wing has been fully closed, the link will never reach its extreme position shown in FIG. 4, the result being that the wing will always be left slightly ajar.

With the wing in on open position, whether the opening angle be large or small, the four joints will assume a relative position as shown in FIGS. 1 and 2. The axes of the four joints form a quadrangle having sides of different lengths; however, the quadrangle will always be closed. The pressure of spring 6 acts on the joint 12 through the spring guide rod 5, the joint 13 and the link 3 to balance the weight of the wing. With the wing closed as shown in FIG. 4, however, the joint 11 with its roller 11' assumes a position such that its axis lies within a triangle formed by the three remaining joints. Under these circumstances, the spring force tends to cause rotation in an opposite direction so that the wing, while being forced against the sealing means by its deadweight, is additionally loaded by the spring. It will therefore be seen that the position of the abutment point 18 on link 3 will always have to be selected in such a manner as to permit the joint 11 to move into the area of the triangle mentioned earlier. Otherwise it would be impossible to reverse the direction of action of the spring force.

In order to limit the opening angle of the wing, the largest angle being normally selected to be 90°, there is provided on the spring guide rod 5 an abutment 19 which will come into contact with the pivot pin 11 to limit the motion of the wing upon the wing being moved into its fully opened position as shown in FIGS. 1 and 2.

It will be appreciated that it is, of course, possible to interchange the two hinge members, i.e. to attach the hinge member 2 including the spring guide rod 5 to the wing rather than to the wall of the container.

FIG. 5 shows a further embodiment of the invention including a spring guide rod 5 carrying an external helical spring 6 and an internal helical spring 6a disposed concentrically therewithin. Also in the embodiment of FIG. 5 the spring guide tube 7 may be adjusted to vary the tension of the two helical springs 6 and 6a. It is convenient to use two springs of opposite hand. In that case, the inner spring is guided by the spring guide rod 5, whereas the outer spring is guided by the inner one. In this manner, mutual jamming of the two springs is precluded.

What is claimed is:

1. A weight-balancing hinge structure for compartments, preferably freezer cabinets, having a lid or the like operable about a substantially horizontal axis, comprising a first hinge member adapted to be connected to said lid, and a second member adapted to be connected to said compartment, a bolt pivotally connecting said first and said second members, a biased spring means supported at its one end on said second member and connected at its other end by bell crank link means to said first member, a first and a second pin being fixedly mounted to said first and said second members, respectively, and spaced from said bolt, a third pin being provided at the other end of said spring means, said bell crank means comprising a first linking member being articulated to said first and said third pins, and a second linking member being articulated to said second and said third pins; the main axis of said bolt and said first, second and third pins being substantially parallel to each other and the distance between the main axis of said bolt and said first pin being greater than the distance between said second and said third pin, the bias of the spring and the spacing of the pins from each other being such that the weight of the lid will be balanced to maintain the lid in a desired position.

2. A hinge structure according to claim 1, wherein said second link member is provided with an elongated slot, said slot being penetrated by said third pin, so that the effective length of the lever arm of said second link member is varied discontinuously from a greater length to a shorter length when the lid is moved from its open to its closed position and vice versa, said first linking member being provided at its end articulated to said third pin with a first guiding surface section adapted to slide along the periphery of said second pin in order to maintain the greater effective length of said second link member when the lid is in a position between being completely open and almost closed, and said first linking member being provided at its end articulated to said third pin furthermore with a second guiding surface section adapted to slide along the periphery of said second pin when said lid is in a position between almost closed and completely closed in order to control the pressure of said lid against said compartment.

3. A hinge structure according to claim 2, wherein said second pin is embraced by a roller rotatable with respect to said second pin.

4. A hinge structure according to claim 3, where a third guiding surface section is provided on said second linking member adapted to engage the outer surface of said roller in order to limit the pressure applied to said compartment by said lid when said lid is in its closed position.

5. A hinge structure according to claim 4, wherein said third guiding surface section is arranged in such a manner that in the closed position of said lid the main axis of said bolt, said first and said third pin define a triangle enclosing the main axis of said second pin.

6. A hinge structure according to claim 5, wherein said spring means comprises a coil spring and a guiding rod being articulated at its one end to said third pin and being provided with a shoulder portion adjacent to said one end, said coil spring surrounding said guiding rod with its one end supported at said second hinge member and with its other end being supported at said shoulder portion, said guiding rod being furthermore provided with an abutment adapted to engage said roller when said lid is in its open position in order to limit the opening movement of said lid.

7. A hinge structure according to claim 6, wherein a tubular member is interconnected between said coil spring and said second hinge member, a ring member arranged substantially coaxially with said tubular member and engaging said tubular member, brackets rigidly secured to said second hinge member supporting said ring member in such a manner that said ring member can perform a rocking movement about said brackets about an axis substantially perpendicular to the main axis of said tubular member, said tubular member being axially movable with respect to said ring member in order to adjust the bias of said spring, said guide rod having an additional section protruding over the portion surrounded by said spring, said additional section being longitudinally movably received within said tubular member.

8. A hinge structure according to claim 7, wherein said tubular member is provided with an outer thread and said ring member is provided with an inner thread engaging said outer thread.

9. A hinge structure according to claim 8, wherein the cross section of said additional section of said spring guiding rod is less than the cross section of said portion of said spring guiding rod surrounded by said spring so that a shoulder is formed, said shoulder being adapted to engage the one end of said tubular member supporting said coil spring when said lid is closed, in order to limit the compression of said spring and to prevent complete closure of said lid.

10. A hinge structure according to claim 9, wherein there are provided on the said spring guide rod two helical springs disposed concentrically within one another.

11. The hinge structure of claim 10, wherein one of the two helical springs is left-handed, the other helical spring being right-handed.

12. The hinge according to claim 11 wherein the distance between said first and fourth pivot pins is greater than the distance between said second and third pivot pins.

13. A spring guiding arrangement for a hinge structure having a first and a second hinge member pivotally connected to each other, and spring means interconnected between said hinge members, said arrangement comprising a spring guide rod adapted to pivotally engage said first hinge member and having a shoulder portion, a central portion and a lower portion, a coil spring embracing said guiding rod substantially along said central portion and at its one end engaging said shoulder portion, a tubular member supporting at its one end the other end of said coil spring, a ring member arranged substantially coaxially with said tubular member and engaging said tubular member, brackets being rigidly secured to said second hinge member supporting said ring member in such a manner that said ring member can perform a rocking movement about said brackets about an axis substantially perpendicular to the main axis of said tubular member, said tubular member being axially movable with respect to said ring member in order to adjust the bias of said spring, said lower portion being longitudinally movably received within said tubular member.

14. A spring guiding arrangement according to claim 13, wherein said tubular member is provided with an outer thread and said ring member is provided with an inner thread engaging said outer thread.

15. A spring guiding arrangement according to claim 14, wherein the cross section of said lower portion is less than the cross section of said central portion, so that a shoulder is formed, said shoulder being adapted to engage the one end of said tubular member supporting said coil spring in order to limit the compression of said spring.

16. A hinge structure for freezer cabinets or the like having lids pivotal about a horizontal axis, said hinge comprising a first member rigidly mounted on said cabinet, a second member rigidly mounted on said lid, a first pivot pin connecting said first and second members, a pressure spring mounted with one end connected to said first member in such manner as to allow adjustment of the bias of the spring and the other end engaging said second member through a guiding means, said guiding means comprising a spring guiding rod secured to said pressure spring, a first pivotal bracket, a second pivotal bracket, a second pivot pin pivotally mounting said first pivotal bracket at one end to said first member, an elongated slot in the other end of said first pivotal bracket, a third pivot pin pivotally mounting one end of said second pivotal bracket and one end of said spring guiding rod in said elongated slot, a fourth pivot pin pivotally connecting the other end of said second pivotal bracket to said lid, the end of said second pivotal bracket adjacent said first pivotal bracket having first and second cam surfaces corresponding to a control curve and a tightening curve respectively, said first cam surface engaging said second pivot pin when said lid is pivoted and said second cam surface lockingly engaging said second pivot pin when said lid is in a closed position.

References Cited by the Examiner

UNITED STATES PATENTS

| | | | |
|---|---|---|---|
| 2,206,326 | 7/40 | Ludwig et al. | 16—163 |
| 2,758,454 | 8/56 | Cossin | 16—166 X |
| 2,840,847 | 7/58 | Danser | 16—163 X |
| 2,911,667 | 11/59 | Burke | 16—190 X |
| 3,001,225 | 9/61 | Squire | 16—190 X |
| 3,078,499 | 2/63 | Gray et al. | 16—52 |

JOSEPH D. SEERS, *Primary Examiner.*

DONLEY J. STOCKING, *Examiner.*